United States Patent
Bhargava et al.

(10) Patent No.: US 9,441,118 B2
(45) Date of Patent: Sep. 13, 2016

(54) WATER SOLUBLE POLYMER POWDERS WITH IMPROVED DISPERSIBILITY

(71) Applicant: Hercules Incorporated, Wilmington, DE (US)

(72) Inventors: Prachur Bhargava, Newark, DE (US); Michael A. Tallon, Aberdeen, NJ (US); Konstantin A. Vaynberg, Cherry Hill, NJ (US)

(73) Assignee: Hercules Incorporated, Wilmington, DE (US)

( * ) Notice: Subject to any disclaimer, the term of this patent is extended or adjusted under 35 U.S.C. 154(b) by 149 days.

(21) Appl. No.: 13/933,512

(22) Filed: Jul. 2, 2013

(65) Prior Publication Data

US 2014/0007791 A1    Jan. 9, 2014

Related U.S. Application Data

(60) Provisional application No. 61/667,497, filed on Jul. 3, 2012.

(51) Int. Cl.
| | |
|---|---|
| *C09D 7/12* | (2006.01) |
| *C08J 3/12* | (2006.01) |
| *C09D 125/14* | (2006.01) |

(Continued)

(52) U.S. Cl.
CPC .............. *C09D 7/125* (2013.01); *C08J 3/12* (2013.01); *C08J 3/126* (2013.01); *C08J 3/128* (2013.01); *C09D 125/14* (2013.01); *C08J 2300/14* (2013.01); *C08J 2301/08* (2013.01); *C08J 2301/26* (2013.01); *C08J 2301/28* (2013.01); *C08J 2305/00* (2013.01); *C08J 2333/26* (2013.01); *C08J 2339/06* (2013.01); *C08J 2425/08* (2013.01); *C08J 2425/14* (2013.01); *C08J 2433/00* (2013.01); *C08J 2435/06* (2013.01); *C08J 2435/08* (2013.01); *C08J 2447/00* (2013.01); *C08J 2459/02* (2013.01); *C08J 2471/02* (2013.01); *C08J 2475/16* (2013.01); *C08J 2483/04* (2013.01); *C08K 3/16* (2013.01); *C08K 3/38* (2013.01); *C08K 5/521* (2013.01); *C08K 5/5205* (2013.01)

(58) Field of Classification Search
None
See application file for complete search history.

(56) References Cited

U.S. PATENT DOCUMENTS 3,954,495 A * 5/1976 Osswald et al. .............. 524/159
5,001,170 A    3/1991 Keegan (Continued)

FOREIGN PATENT DOCUMENTS

| EP | 1838782 | 2/2011 |
|---|---|---|
| FR | 2 237 960 A1 | 2/1975 |

(Continued)

OTHER PUBLICATIONS

International Search Report, PCT/US2013/049075 published on Jan. 9, 2014.

*Primary Examiner* — Colin W Slifka
(74) *Attorney, Agent, or Firm* — Dunlap Codding, P.C.; Shaorong Chen

(57) ABSTRACT

The presently disclosed and claimed inventive concept(s) relates to a dry powder composition comprising water soluble polymer powders, and a component in powder form. The dry powder composition shows improved water dispersibility compared to the water soluble polymer powders. The presently disclosed and claimed inventive concept(s) further relates to an aqueous protective coating composition comprising the dry powder composition.

20 Claims, 4 Drawing Sheets

(51) Int. Cl.
 *C08K 3/16* (2006.01)
 *C08K 3/38* (2006.01)
 *C08K 5/52* (2006.01)
 *C08K 5/521* (2006.01)

(56) References Cited

U.S. PATENT DOCUMENTS 6,005,044 A * 12/1999 Karl et al. .................. 524/497
7,932,309 B2   4/2011 Gillette et al.
2007/0092666 A1 *  4/2007 Hood et al. ................ 428/32.34
2009/0246294 A1 * 10/2009 Hochstein ............... A23L 1/275
                                                        424/646
2013/0101865 A1   4/2013 Ren et al.
2013/0116373 A1   5/2013 Hayes

FOREIGN PATENT DOCUMENTS

| GB | 1 465 934 A | 3/1977 |
| JP | 2000 095552 A | 4/2000 |
| WO | 2012122153 | 9/2012 |

* cited by examiner

WATER SOLUBLE POLYMER POWDERS WITH IMPROVED DISPERSIBILITY

CROSS REFERENCE TO RELATED APPLICATIONS

The present application claims the benefit under 35 U.S.C. 119 (e) of U.S. Provisional Patent Application Ser. No. 61/667,497, filed Jul. 3, 2012, the entire content of which is hereby expressly incorporated herein by reference.

BACKGROUND OF THE INVENTION

1. Field of the Disclosed and Claimed Inventive Concepts

The presently disclosed and claimed inventive concept(s) relates to a dry powder composition containing water soluble polymer powders with improved water dispersibilty, a method of making the dry powder composition, an aqueous protective coating composition, and a method of making an aqueous protective coating formulation.

2. Background and Applicable Aspects of the Presently Disclosed and Claimed Inventive Concept(s)

Water soluble polymer powders are known to form lumps when added directly to water based systems. The problem arises when the powders begin to rapidly swell and solubilize while contacted with the water based systems. To suppress lump formation it is needed to slow down the process of swelling/solubilization sufficiently enough to allow particles to separate, i.e. disperse. The improved water dispersibility is a key requirement in efficient lump free dissolution of the water soluble polymer powders and has broad industrial utility and importance.

DETAILED DESCRIPTION

Figure 1:
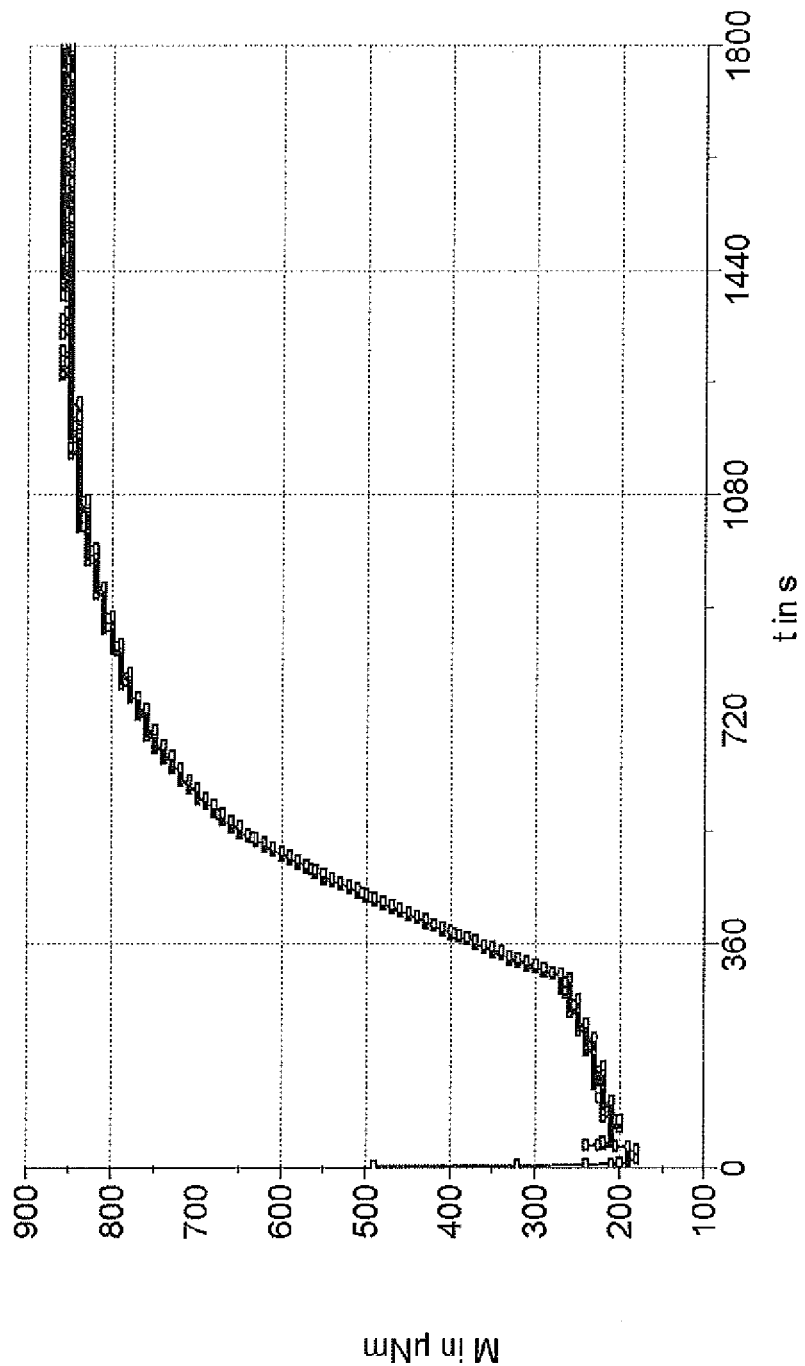
FIG. 1 is a graph illustrating dissolution over time of the powder sample of Example 2 in DI water.

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular. Generally, nomenclatures utilized in connection with, and techniques of chemistry described herein are those well known and commonly used in the art. Reactions and purification techniques are performed according to manufacturer's specifications or as commonly accomplished in the art or as described herein. The nomenclatures utilized in connection with, and the laboratory procedures and techniques of, analytical chemistry, synthetic organic chemistry, and medicinal and pharmaceutical chemistry described herein are those well known and commonly used in the art. Standard techniques are used for chemical syntheses, chemical analysis, pharmaceutical preparation, formulation, and delivery, and treatment of patients.

All patents, published patent applications, and non-patent publications mentioned in the specification are indicative of the level of skill of those skilled in the art to which this presently disclosed and claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, and/or the variation that exists among the study subjects. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

The term "dispersion" is used herein to refer to what might also be termed an "emulsion", "slurry" or "sol" and constitutes a vehicle containing water soluble polymer that can be used in applications where water soluble polymer in particulate or liquid form are conventionally used. Hereinafter, the terms "dispersion", "emulsion", "slurry" and "sol" are used interchangeably.

The presently disclosed and claimed inventive concept(s) relates to a dry powder composition containing water soluble polymer powders, a method of making the dry powder composition, an aqueous protective coating composition, and a method of making the aqueous protective coating.

According to the presently disclosed and claimed inventive concept(s), a dry powder composition comprises or consists of or consists essentially of water soluble polymer powders and a component, wherein the component is selected from the group consisting of boric acid, sodium chloride, sodium metaborate, poly(methylvinylether-alt-maleic acid), poly(methylvinylether-alt-maleic acid)ester copolymer, poly(methylvinylether-alt-maleic anhydride), poly(methylvinylether-alt-maleic anhydride)ester copolymer, poly(styrene-co-maleic acid), poly(styrene-co-maleic acid) ester copolymer, poly(styrene-co-maleic anhydride), poly(styrene-co-maleic anhydride)ester copolymer, styrene acrylic acid copolymer, styrene acrylic acid ester copolymer, hydrophobically modified polyacetal polyether, polyvinylpyrrolidone, polyvinylpolypyrrolidone, isobutylene/dimethylaminopropylmaleimide hydroxyethylmaleimide copolymer, isobutylene ethylaminopropylmaleimide/ethoxylated maleimide/maleic acid copolymer, urethane acrylate methacrylate, urea phosphate, silicone, acrylic polymer, polydiallyl dimethyl ammonium chloride, phosphorus ester, polyoxyethylene-polyoxypropylene block copolymer, and hydrophobically modified ethoxylated urethane, vinylpyrrolidone vinylacetate copolymer, and combinations thereof.

Examples of the poly(methylvinylether-alt-maleic acid) ester copolymer can be, but are not limited to, poly(methylvinylether-alt-maleic acid monoethyl ester), poly(methylvinylether-alt-maleic acid monoisopropyl ester), and poly(methylvinylether-alt-maleic acid monobutyl ester).

Examples of the poly(methylvinylether-alt-maleic anhydride)ester copolymer can be, but are not limited to, poly(methylvinylether-alt-maleic anhydride monoethyl ester), poly(methylvinylether-alt-maleic anhydride monoisopropyl ester), and poly(methylvinylether-alt-maleic anhydride monobutyl ester).

Examples of the poly(styrene-co-maleic acid)ester copolymer can be, but are not limited to, poly(styrene-co-maleic acid methyl ester), poly(styrene-co-maleic acid ethyl ester), poly(styrene-co-maleic acid propyl ester), poly(styrene-co-maleic acid isopropyl ester) and poly(styrene-co-maleic acid butyl ester).

Examples of the poly(styrene-co-maleic anhydride)ester copolymer can include, but are not limited to, poly(styrene-co-maleic anhydride methyl ester), poly(styrene-co-maleic anhydride ethyl ester), poly(styrene-co-maleic anhydride propyl ester), poly(styrene-co-maleic anhydride isopropyl ester), and poly(styrene-co-maleic anhydride butyl ester).

The water soluble polymer powders can be polyacrylamides, polyacrylamide derivatives, polyvinylpyrrolidones, polyvinylpyrrolidone derivatives, guar gums, guar gum derivatives, celluloses and cellulose derivatives. In one non-limiting embodiment, the water soluble polymer is cellulose ether.

The cellulose ethers can be hydroxyalkyl cellulose ethers. These can include, but are not limited to, hydroxyethyl cellulose (HEC), hydroxypropyl cellulose (HPC), ethylhydroxyethyl cellulose (EHEC), carboxymethyl cellulose (CMC), carboxymethylhydroxyethyl cellulose (CMHEC), hydroxypropylhydroxyethyl cellulose (HPHEC), methylcellulose (MC), methylhydroxypropyl cellulose (MHPC), methylhydroxyethyl cellulose (MHEC), carboxymethylmethylcellulose (CMMC), hydrophobically modified carboxymethylcellulose (HMCMC), hydrophobically modified hydroxyethyl cellulose (HMHEC), hydrophobically modified hydroxylpropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (HMMC), hydrophobically modified methylhydroxypropyl cellulose (HMMHPC), hydrophobically modified methylhydroxyethyl cellulose (HMMHEC), hydrophobically modified carboxymethylmothyl cellulose (HMCMMC), cationic hydroxyethyl cellulose (cationic HEC) and cationic hydrophobically modified hydroxyethyl cellulose (cationic HMHEC). In one non-limiting embodiment, the cellulose ether is HEC.

The cellulose ether powder can be treated with small amounts of a cross-linker. The cross-linking can be carried out under conditions such that only a slight amount of formation of cross-linkages takes place, according to the method set forth in U.S. Pat. No. 2,879,268, the disclosure of which is incorporated herein by reference in its entirety. The concentration of the cross-linker in the cellulose ether powders can be up to about 8% by weight. In one non-limiting embodiment, the concentration of the cross-linker in the cellulose ether powders can be between about 0.01 to 5% by weight.

The cross-linker is a multifunctional molecule having at least first and second reactive moieties. At least one of the reactive moieties is an aldehyde which can react with the pendent hydroxyl group of the cellulose ether to form a hemiacetal bond. The second reactive moiety can be a wide variety of different groups that can react with the cellulose ether, preferably the pendent hydroxyl group of the cellulose ether. These reactive groups can include, but are not limited to, carboxyls, silanols, isocyanates, halomethyl, alkyl tosylate ether, and epoxide. The cross-linker may be a dialdehyde such as glyoxal. Glyoxalated cellulose ethers are commercially available.

In addition to those used as the component described above, other chemicals can also be used as the component to improve the dispersion of the water soluble polymer powders. The component can be an inorganic compound. For example, but by no way of limitation, the component can be $CaCl_2$, $Na_2CO_3$, $CaCO_3$, phosphorous pentoxide particles, phosphoric acids and salts, sulfates, sulfonic acids and salts, and sulfinic acids and salts. The salts can be based on Li, Na, K, Mg, and transition metals. Examples of phosphates can include, but are not limited to, $NaH_2PO_4$, $Na_2HPO_4$, and $Na_3PO_4$.

In one non-limiting embodiment, $CaCO_3$ nano cross-linker can be used to slow down cellulose ether solubilization and improve its dispersibility. A process for improving the dispersibility of the cellulose ether powers comprises preparing cellulosic ether dispersion in aqueous t-butyl alcohol (about 10 wt % water) to form a slurry and adding calcium oxide (about 2 g) to the slurry under rigorously stirring. After about 30 minute stirring, $CO_2$ is bubbled through the dispersion using a fritted disperser. This process can generate a suspension where the $CaCO_3$ particles are formed on the surfaces of cellulose ether. Then, the suspension can be filtered, washed with acetone, and dried.

In addition to the polymers and/or copolymers described previously, other soluble/swellable, linear and/or branched, and/or lightly cross-linked polymer particles can also be used to blend with or be coated on the water soluble polymer powders to improve the dispersibility of the water soluble polymer powders. The polymers can be homopolymers, co-polymers and terpolymers. The polymers can be based on poly-esters/acids/anhydrides/amides/imides/urethanes/ureas and blends thereof.

Examples of such polymers can include, but are not limited to, polyacrylic acid, polylmethacrylic acid, polyacrylate, polymethylacrylate, polymethylmethacrylate, polyacrylamide, polymethacrylamide, poly-itaconate, polycrotonate, polyvinylacetate, polylactams such as polyvinylcaprolactam, polyacetals, polyketals, imidized isobutylene/maleic anhydride copolymer, polydiallyl dimethyl ammonium chloride, polylactam, polyvinylcaprolactam, polyvinyl alcohol, phosphorous esters, and mixtures thereof.

The phosphate esters can be utilized either alone or in combination with pH responsive polymers to further improve dispersions. Examples of the phosphorous esters can include, but are not limited to, triethyl phosphate and dimethyl-hydrogen phosphate. The coating can be made by reacting phosphate ester with the polymer on the surface of polymer powders at elevated temperatures (e.g., about 100° C.) thereby producing phosphor-esters by transesterification with the alcoholic groups of cellulose to form a temporary covalent-bond between the cellulose particles and its coating.

The pH sensitive polymers are materials which can respond to the changes in the pH of the surrounding medium by varying their dimensions. Such materials increase its size (swell) or collapse depending on the pH of their environment. There are two kinds of pH sensitive materials. One has an acidic group such as —COOH and —$SO_3H$, which can swell and is soluble in basic pH (high pH). The other one has a basic group such as —$NH_2$, which can swell or is soluble in acidic pH (lower pH). In accordance with the presently disclosed and claimed inventive concept(s), the pH sensitive polymers can be those containing acidic groups. Examples of the pH sensitive polymers can include, but are not limited to, acrylate copolymer, isobutylene/dimethylaminopropyl maleimide/ethoxylated maleimide/maleic acid copolymer, hydrophobically modified alkali soluble acrylic polymer, and ammonium acryloyldimethyltaurate/VP copolymer.

Moreover, a carboxyl and silicone functional polymer can be used to impart hydrophobicity to the HEC surface to provide good dispersion but solubilize at higher pH. The coatings can chemically be reacted with the HEC surface by appropriate heat treatment and/or utilizing catalysts such as sodium hypophosphite during the coatings process. The coating will either hydrolyze or become soluble to activate solubilization of HEC.

In one non-limiting embodiment, the component can be siloxane. A cellulose ether derivative is tumbled in Glax coater to which a solution of 1,1,1 6,6,6 hexamethoxy siloxane (3 wt %) in methylene chloride is added by spraying at about 50° C. The coated powder is then heated to about 90° C. to produce cross-linked particles with delayed solubility.

Specifically, poly(methylvinylether-alt-maleic acid) is available under the trade name Gantrez™ S-97 BF; monoalkyl ester of poly(methylvinylether-alt-maleic acid) copolymer is commercially available under the trade name Gantrez™ ES-225; poly(methylvinylether-alt-maleic acid) is commercially available under the trade name Gantrez™ AN-169; poly(methylvinylether-alt-maleic anhydride) is commercially available under the trade names Gantrez™ AN-119 and Gantrez™ AN-139; styrene/maleic anhydride copolymer is commercially available under the trade name Scripset™ 550; polyvinyl polypyrrolidones are available under the trade names Disintex™ 75 and Disintex™ 200; polyvinylpyrrolidones are available under the trade names Plasdone™ K-12, Plasdone™ K-17, and Plasdone™ K-90; vinylpyrrolidone vinylacetate copolymer is available under the trade name Plasdone™ S-630; isobutylene/dimethylaminopropyl maleimide/ethoxylated maleimide/maleic acid copolymer is available under the trade name Aquaflex™ XL-30; pofyacrylato is available under the trade name Jaypol™ S100; polyacrylamide is available under trade name Praestol™; isobutylene/ethylmaleimide/hydroxyethylmaleimide copolymer is available under the trade name Aquaflex™ FX-64; and polyacetal poly ether is available under the trade name Aquaflow™. All these commercial products are available from Ashland Inc.

Styrene acrylic acid copolymers and styrene acrylic acid ester copolymers are commercially available from BASF under the trade name Joncryl®. Polyoxyothylene-polyoxypropylene block copolymers are commercially available from BASF under the trade name Pluronic®. Polydiallyl dimethyl ammonium chlorides are commercially available from Lubrizol under the trade name Merquat™. Polyvinyl alcohols are commercially available from Celanese under the trade name Celvol™. Acrylic polymers are commercially available from The Dow Chemical Company under the trade name Rhoplex™ SG-10M.

The dry powder composition can be formed by blending the water soluble polymer powders with the component or by coating the component on the water soluble polymer powders. Any known dry blending technique or apparatus can be used to blend the water soluble polymer powders with the component in powder form. For example, but not by way of limitation, the water soluble polymer powders and the component can be blended in mortar and pestle, ball mills, or attritor mills.

Coating the component on the water soluble polymer powders can be easily carried out at ambient temperature in common solvents used in the industry, for example but not by way of limitation, acetone or methanol. The component can be dissolved in acetone or methanol to form solution. Then, the water soluble polymer powders can be mixed with the solution under rigorous stirring. Acetone or methanol can be evaporated to dryness by vacuum or mild heating thereby generating free-flowing powders containing the water soluble polymer powders and the component.

The component comprises or consists of or consists essentially of about 0.5 to about 15.0 weight % based on the total weight of the blended or coated water soluble polymer powders. In one non-limiting embodiment, the component comprises or consists of or consists essentially of about 1.5 to about 10.0 weight % based on the total weight of the blended or coated water soluble polymer powders.

In accordance with the presently disclosed and claimed inventive, the dry powder composition can be used in an aqueous protective coating composition (i.e., lacquers, latex paints, etc.). The aqueous protective coating composition comprises or consists of or consists essentially of the dry powder composition containing water soluble powders described previously. The aqueous protective coating composition further comprises a water-insoluble latex polymer as film former (also referred to as binder), pigment, and water. In addition, the aqueous protective coating composition may contain other functional additives, for example, but not by way of limitation, dispersants (e.g., polyphosphates, amino alcohols, and acrylic copolymers), defoamers (e.g., nonsilicone and silicone types), surfactants, biocides/preservatives, coalescing agents (high-boiling organic solvents), plasticizers, stabilizers, viscosifiers, leveling aids, defoamers, anti-skinning agents, extenders, crosslinkers, corrosion inhibitors, surface improvers, matting agents, humectants/wet-edge agents (e.g., ethylene glycol, propylene glycol, and hexylene glycol), coalescing agents (e.g. glycol ethers/esters and surface-active agents), pH modifiers, and colorants, etc.

A wide variety of latex polymers can be used in the aqueous protective coating composition of the presently disclosed and claimed inventive concept(s). They are made by polymerization of various ethylenically unsaturated monomers, such as ethylene, vinyl, and acrylic monomers. Oftentimes, latex polymers are made by copolymerizing more than one monomer to achieve several desired properties, particularly for applications in latex paints with very little or no volatile organic compounds (VOCs). Examples of synthetic polymeric latexes used in the aqueous protective coating composition can include, but are not limited to, homo- or co-polymers of vinyl acetate, methacrylic acid, methylacrylate, methylmethacrylate, ethylacrylate, butyl acrylate, styrene, ethylene, vinyl chloride, vinyl ester of versatic acid (VeoVa), vinyl propionate, butadiene, acrylonitrile, maleates, and fumarates. In one non-limiting embodiment, the latex polymer is selected from the group consisting of acrylics, vinyl-acrylics and styrene-acrylics.

Other latex polymers can include, but are not limited to, alkyds, cellulosics (cellulose nitrate and cellulose esters), coumarone-indenes, epoxies, esters, hydrocarbons, melamines, natural resins, oleo resins, phenolics, polyamides, polyesters, rosins, silicones, terpenes, ureas, urethanes, vinyls, and the like.

In one non-limiting embodiment, the pigment is selected from the group consisting of hydrated aluminum oxide, barium sulfate, calcium silicate, lay, silica, talc, titanium dioxide, zinc oxide, magnesium aluminum silicate, and mixtures thereof. Oftentimes, titanium dioxide grades used in the aqueous protective coating composition are surface modified with various inorganic oxides, such as silicates, aluminatos, and zirconates. Aluminum silicate, nepeline syenite, mica, calcium carbonate, and/or diatomaceous earth can also be employed.

For colored coatings, desired colorants can be added to the aqueous protective coating composition. The colored species can be metallic oxides, such as iron or chromium oxide or synthetic organic pigments. Carbon black can also be used as a colorant to tailor the color of a coating.

The type and amount of pigment present in aqueous protective coating composition dictate the performance properties, such as gloss, permeability, scrub resistance, tensile strength, etc. of the dried film. Hence, coatings are characterized by their pigment volume concentration (PVC). The PVC is a percentage and represents a volume ratio of pigment to total solids present in the dried film. PVC is defined as:

$$PVC\ \% = \frac{\text{Pigment Volume}}{\text{Pigment Volume} + \text{Latex Volume}} \times 100$$

The point at which all voids between pigment particles are just filled with the latex binder is called the critical pigment-volume concentration (CPVC).

The aqueous protective coating composition has a PVC upper limit of about 85% by weight. In one non-limiting embodiment, the aqueous protective coating composition has a PVC upper limit of about 75% by weight. In another non-limiting embodiment, the aqueous protective coating has a PVC upper limit of about 65% by weight.

The aqueous protective coating composition has a PVC lower limit of about 10% by weight. In another non-limiting embodiment, the aqueous protective coating composition has a PVC lower limit of about 20% by weight. More particularly, when the latex paint is high gloss paint, the PVC is from about 15% to about 30% by weight; when the paint is a semi-gloss paint, the PVC is from about 20% to about 35% by weight; and when it is a flat paint, the PVC is from about 40% to about 85% by weight.

The amount of the dry powder composition used in the aqueous protective coating composition of the presently disclosed and claimed inventive concept(s) is the amount effective in providing the desired thickening and rheological properties to the coating composition and thus will depend upon both the rheological properties desired and the dispersion employed. In one non-limiting embodiment, the minimum amount is about 0.01 wt % of the wet coating composition. In another non-limiting embodiment, the minimum is about 0.05 wt % of the wet coating composition. In one non-limiting embodiment, the maximum amount is about 10 wt % of the wet coating composition. In another non-limiting embodiment, the maximum amount about 5 wt % of the wet coating composition.

The aqueous protective coating composition may optionally contain other components such as those generally used in such compositions. Typical components include, but are not limited to, one or more of the following: solvents, fillers, dryers, flattening agents, plasticizers, stabilizers, dispersants, surfactants, viscosifiers, suspension agents, flow control agents, defoamers, anti-skinning agents, biocides/preservatives (e.g., non-mercurial type), extenders, filming aids, crosslinkers, surface improvers, corrosion inhibitors, and other ingredients useful in aqueous protective coating compositions.

The presently disclosed and claimed inventive concept(s) further relates to a method of incorporating the dry powder composition of the presently disclosed and claimed inventive concept(s) into an aqueous protective coating formulation, which is to simply add the dry powder composition to a coating formulation under agitation.

The following examples illustrate the presently disclosed and claimed inventive concept(s), parts and percentages being by weight, unless otherwise indicated. Each example is provided by way of explanation of the presently disclosed and claimed inventive concept(s), not limitation of the presently disclosed and claimed inventive concept(s). In fact, it will be apparent to those skilled in the art that various modifications and variations can be made in the presently disclosed and claimed inventive concept(s) without departing from the scope or spirit of the invention. For instance, features illustrated or described as part of one embodiment, can be used on another embodiment to yield a still further embodiment. Thus, it is intended that the presently disclosed and claimed inventive concept(s) covers such modifications and variations as come within the scope of the appended claims and their equivalents.

EXAMPLES

Example 1

All the samples in Example 1 were prepared using either blending or coating described as follows:

Blending—Blending was conducted by combining hydroxylethyl cellulose (Natrosol®250HBR, available from Ashland Inc.) with a component in powder form. The ingredients were combined in about 90:10 proportions by weight in a 20 gram scintillation vial and blended using vortex mixer until visually homogeneous.

Coating: Natrosol®250HBR coating was carried out using either acetone or methanol (referred to as a carrier hereinafter) depending on the component's solubility. The component was dissolved in the carrier to form a 7.74 wt % solution. 17 grams of the solution were thoroughly mixed with about 25 grams of Natrosol®250HBR to form a paste. The paste was then transferred to a fluidized bed drier and dried according to the following procedure: 5 minutes at ambient conditions, 5 minutes at about 65° C., and 5 minutes under ambient conditions. The resulting coated product contained about 5 wt % of the component based on the total weight of the final product. Mortar and pestle were used to ground the particle agglomerates if formed.

The samples (dry powders) prepared above were tested for dispersibility in buffer and paint test systems described below.

Buffer Test System (BTS):

2.2 grams of the dry powders were added into 220 grams of a thickened buffer to form a mixture in an 8 oz jar. The thickened buffer was prepared by dissolving about 0.5 wt % Natrosol® HBR in 0.1M TRIS buffer at pH≈8.5. The mixture was stirred at about 25° C. and 300 RPM using 1½" marine propeller shaped agitator.

Paint Test System (PTS):

1.68 grams of the dry powders were added into 220 grams of UCAR 379G vinyl acrylic interior flat paint (PVC=70%) at pH≈8.5 and 48 grams of water to form a mixture in an 8 oz jar. Table 1 below lists the formula of the flat paint. The mixture was stirred at about 25° C. and 300 RPM using 1½" marine propeller shaped agitator.

TABLE 1

UCAR 379G vinyl acrylic interior flat paint (PVC = 70%)

| Ingredient | Wt % |
|---|---|
| Pigment Grind | |
| Distilled Water | 43.8 |
| Nuoseph 95 | 0.3 |
| Tamol 731A | 0.7 |
| Igepal CO-660 | 0.3 |
| Igepal CO-897 | 0.4 |
| AMP-95 | 0.2 |
| Propylene Glycol | 2.0 |
| Rhodeline 640 | 0.2 |
| Ti-Pure R-931 TiO2 | 15.7 |
| ASP NC Clay | 12.2 |
| #10 White Calcium Carbonate | 8.7 |
| Celite 281 | 1.7 |
| Disperse to Hegman 4 to 5 | |
| Add all discretionary water | |
| Letdown | |
| UCAR Latex 379G | 23.2 |
| Texanol | 1.3 |
| Rhodeline 640 | 0.3 |
| Propylene Glycol | 1.5 |

Lump Test—The dry powder sample was added into the BTS or PTS to visually observe the formation of lumps in the systems. The test results are listed in Table 2.

Torque Test—This hydration or dissolving rate was measured using a Haake Visco Tester 550, which measured the amount of torque (force) needed to maintain the rotation of the sensor in the solution at a set speed (300 rpm) as the polymer hydrates and thickening occurs. The torque is proportional to the amount of polymer solubilized. That is, the more the polymer powders are dissolved, the higher the resulting torque is.

In this test, the torques of the dry powder samples treated either by blending or coating were measured compared with the controls of untreated powder samples (Natrosol®250HBR). The polymer contents were the same in the treated and control samples. Table 2 lists the maximum torques measured for treated and control samples under the same conditions.

TABLE 2

Test Results Using Various Components Mixed with HEC.

| | | Visual Dispersibiliity | | Torque (μNm) | | | |
|---|---|---|---|---|---|---|---|
| | | Test | | BTS | | PTS | |
| Component | Treatment | BTS | PTS | Treated | Control | Treated | Control |
| Gantrez ™ ES-225 | Blend | | | | | | |
| | Coat | No lump | No lump | 5300 | 4200 | 4200 | 2300 |
| Gantrez ™ AN-119 | Blend | | | | | 2700 | 2300 |
| | Coat | No lump | No lump | 5300 | 4200 | 4000 | 2300 |
| Gantrez ™ AN-139 | Blend | | | | | | |
| | Coat | | No lump | 5400 | 4200 | | |

TABLE 2-continued

Test Results Using Various Components Mixed with HEC.

| Component | Treatment | Visual Dispersibility | | Torque (μNm) | | | |
| --- | --- | --- | --- | --- | --- | --- | --- |
| | | Test | | BTS | | PTS | |
| | | BTS | PTS | Treated | Control | Treated | Control |
| Gantrez ™ S-97 BF | Blend | | No lump | | | 10000 | 2300 |
| | Coat | | | | | | |
| Boric Acid | Blend | No lump | | 5400 | 4200 | | |
| | Coat | | | | | | |
| Joncryl ® 68 | Blend | | | | | | |
| | Coat | No lump | | 5500 | 4200 | 4000 | 2300 |
| Joncryl ® 678 | Blend | | | | | | |
| | Coat | No lump | | 5400 | 4200 | 3800 | 2300 |
| Joncryl ® 682 | Blend | | | | | | |
| | Coat | No lump | | 5400 | 4200 | 4200 | 2300 |
| Joncryl ® 690 | Blend | | | | | | |
| | Coat | No lump | No lump | 5500 | 4200 | 4200 | 2300 |
| NaCl | Blend | | | 5000 | 4200 | | |
| | Coat | | | | | | |
| Scripset ™ 550 | Blend | | | 4700 | 4200 | | |
| | Coat | | | | | | |
| Plasdone ™ K-12 | Blend | | | | | 3200 | 2300 |
| | Coat | | | | | | |
| Plasdone ™ K-17 | Blend | | | | | 3100 | 2300 |
| | Coat | | | | | | |
| Plasdone ™ K-90 | Blend | | | | | 3200 | 2300 |
| | Coat | | | | | | |
| Aquaflex ™ XL-30 | Blend | | | | | | |
| | Coat | | | | | 5700 | 2500 |
| Aquaflex ™ FX-64 | Blend | | | | | | |
| | Coat | | | | | 3340 | 2500 |
| Urea Phosphate | Blend | | | 5190 | 4700 | 4800 | 2500 |
| | Coat | | | | | | |
| Polydimethylsiloxane | Blend | | | | | | |
| | Coat | | | 5000 | 4200 | | |
| Rhoplex ™ SG-10M | Blend | | | | | | |
| | Coat | | | | | 5500 | 2300 |
| Strodex ™ P100 | Blend | | | | | | |
| | Coat | | | 5000 | 4700 | 5530 | 2500 |
| Sodium Metaborate | Blend | | | 4600 | 4200 | | |
| | Coat | | | | | | |
| Pluronic ® F68 | Blend | | | 4900 | 4200 | | |
| | Coat | | | 5000 | 4200 | | |
| Plasdone ™ S-630 | Blend | | | | | | |
| | Coat | | | 5200 | 4200 | 3900 | 2500 |
| Maleic anhydride ester | Blend | | | | | | |
| | Coat | | | | | 5370 | 2500 |
| Disintex ™ 75 | Blend | | | 5000 | 4200 | | |
| | Coat | | | | | | |
| Disintex ™ 200 | Blend | | | 4700 | 4200 | | |
| | Coat | | | | | | |
| Urethane acrylate methacrylate | Blend | | | | | | |
| | Coat | | | | | 3340 | 2500 |
| Hydrophobically modified ethoxylate urethane | Blend | | | | | | |
| | Coat | | | | | 4700 | 2500 |

Ingredients listed in Table 2:
(1) Gantrez ™ ES-225: commercially available ethyl ester of poly(methyl vinyl ether/maleic acid) copolymer from Ashland Inc.
(2) Gantrez ™ AN-119: commercially available poly(methyl vinyl ether/maleic anhydride) copolymer from Ashland Inc.
(3) Gantrez ™ AN-139: commercially available poly(methyl vinyl ether/maleic anhydride) copolymer from Ashland Inc.
(4) Gantrez ™ S-97 BF: commercially available free acid of poly(methyl vinyl ether/maleic anhydride) copolymer from Ashland Inc.
(5) Joncryl ® 67: commercially available modified acrylic copolymer from BASF.
(6) Joncryl ® 678: commercially available acrylic resin from BASF.
(7) Joncryl ® 682: commercially available low molecular weight acrylic resin from BASF.
(8) Joncryl ® 690: commercially available high molecular weight, high acid value acrylic resin from BASF.
(9) Scripset ™ 550: commercially available styrene/maleic anhydride copolymer from Ashland Inc.
(10) Plasdone ™ K-12, K-17 and K-90: commercially available polyvinyl polypyrrolidones from Ashland Inc.
(11) Aquaflex ™ XL-30: commercially available isobutylene/dimethylaminopropyl maleimide/ethoxylated maleimide/maleic acid polymer from Ashland Inc.
(12) Aquaflex ™ FX-64: commercially available imidized isobutylebe/malice anhydride copolymer from Ashland Inc.
(13) Rhoplex ™ SG-10M: commercially available acrylic polymer from The Dow Chemical Company..
(14) Strodex ™ P100: commercially available phosphate ester from Ashland Inc.
(15) Pluronic ® F68: commercially available polyoxyethylene-polyoxypropylene block copolymer from BASF.
(16) Plasdone ™ S-630: commercially available vinypyrrolidone vinylacetate copolymer from Ashland Inc.
(17) Disintex ™ 75 and Disintex ™ 200: commercially available polyvinyl polypyrrolidones from Ashland Inc.

Example 2

A coating solution was made by dissolving 1 g of Scripset™ 520 (very high molecular weight, styrene/maleic anhydride copolymer, commercially available from Ashland Inc.) and 0.5 g of Strodex™ P100 surfactant (phosphate ester, commercially available from Ashland Inc.) in 36 g acetone/3 g water. The solution was then mixed with 50 g of Natrosol™ 250HX (hydroxylethyl cellulose, commercially available from Ashland Inc.) for about 10 minutes and dried in a fluidized bed dryer at about 70° C. for about 5 minutes. The coated particles having 2 wt % of Scripset 520™ and 1 wt % of Strodex™ P100 were obtained.

Example 3

1.22 g of powder samples obtained from Example 2 was directly added to 200 g DI water (pH≈5.89) while mixing at 200 rpm by a mixer connected to a HAAKE viscometer to measure torque build up with time. FIG. 1 shows the change of torque with time for the mixture. A fine dispersion of HEC (hydroxylethyl cellulose) particles was visually observed. At t=300 sec, 5 drops of 28% ammonia were added to increase the pH to about 10.5. The solution was then turned clear and the torque started to increase rapidly for dissolution. At the end of 30 minutes the lump free solution was obtained.

As a comparative example, 1.22 g of uncoated of Natrosol™ 250HX was added to DI water with the same procedure used for the coated HEC. A big lump was observed resulting in an insufficient buildup of viscosity.

Example 4

Figure 2:
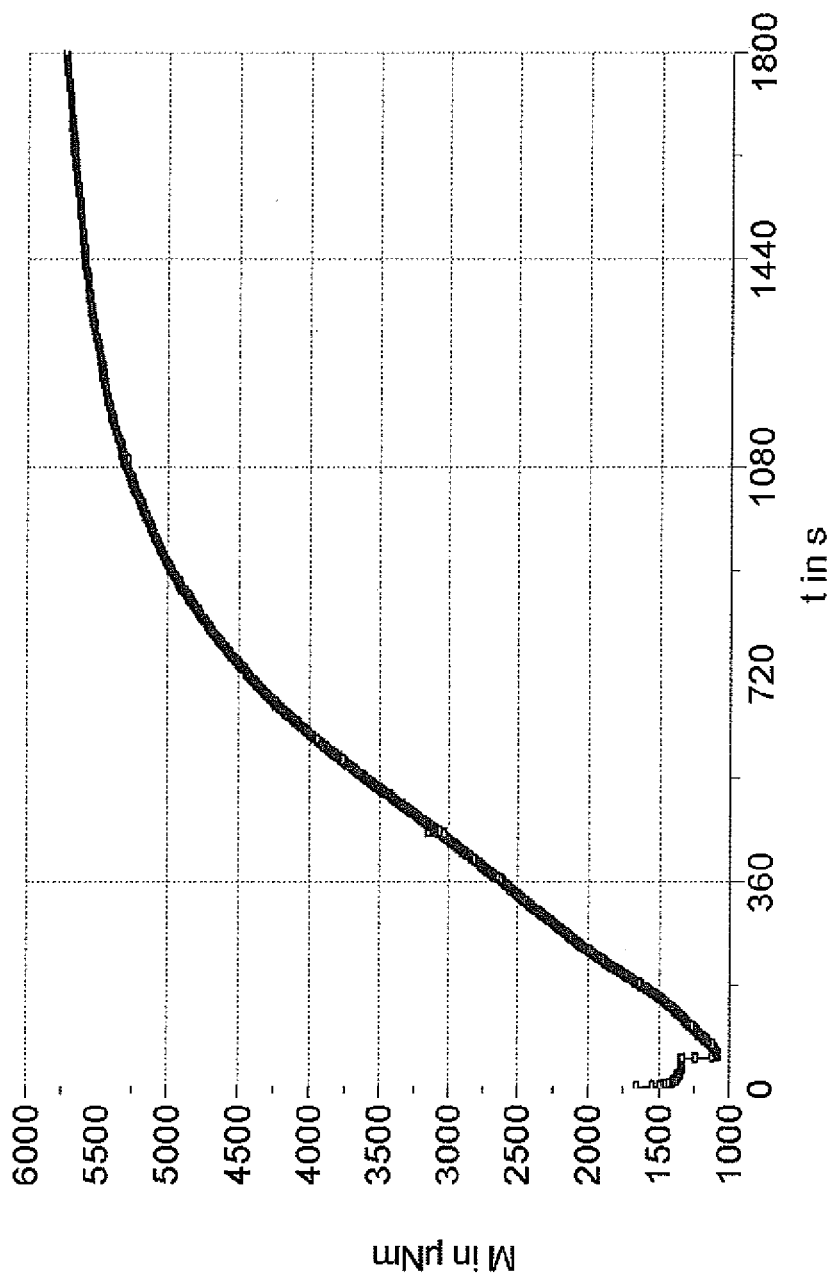
FIG. 2 is a graph illustrating dissolution over time of the powder sample of Example 4 in UCAR 379G vinyl acrylic interior flat paint (PVC=70%).

Coated HEC powder samples (1.22 g of samples obtained from Example 2 in 48 g DI water) was added to 220 g of 70PVC flat paint based on UCAR 379G as shown in Table 1, while mixing at about 300 rpm. FIG. 2 shows the changes of torque with time for the paint after adding the coated HEC powder. Lump free paint was obtained at the end of 30 minutes with a final Stormer viscosity of about 99 KU.

Example 5

C16/C12—PAPE

To an Abbe ribbon blender were added PEG-8000 (2700 g) and sodium hydroxide (108 g) to form a PEG-8000/NaOH mixture. After sealing the reactor, the PEG-9000/NaOH mixture was heated at about 80° C. for about one hour. Then dibromomethane (24.7 g) was added to the PEG-8000/NaOH mixture and the resulting reaction mixture was heated at about 80° C. for about 4 hours to form a PEG-8000/methylene copolymer.

To the PEG-8000/methylene copolymer at about 80° C. were added 1-bromododecane (122.4 g) and 1-bromohexadecane (91 g). The resulting reaction mixture was heated at about 120° C. for about 2 hours. Then, the reactor was opened and the molten reaction mixture was poured into a plastic tray. Upon cooling to room temperature, the reaction mixture was solidified.

Example 6

A coating solution was made by mixing 4 g of a 17.5% aqueous solution of C16-C12-PAPE obtained from Example 5 in 33 g of acetone. The solution was mixed with 50 g of Natrosol® 250HX for about 10 minutes and dried in a fluidized bed dryer at about 70° C. for about 5 minutes. Thus coated HEC particles containing 2 wt % of C16-C12-PAPE were obtained.

Example 7

1.247 grams of the coated samples of Example 6 were added as dry powders to 200 grams of DI water while mixing at about 200 rpm for about six (6) minutes, followed by adding about five (5) drops of ammonia. The particles were dispersed and dissolved without forming any lumps.

Figure 3:
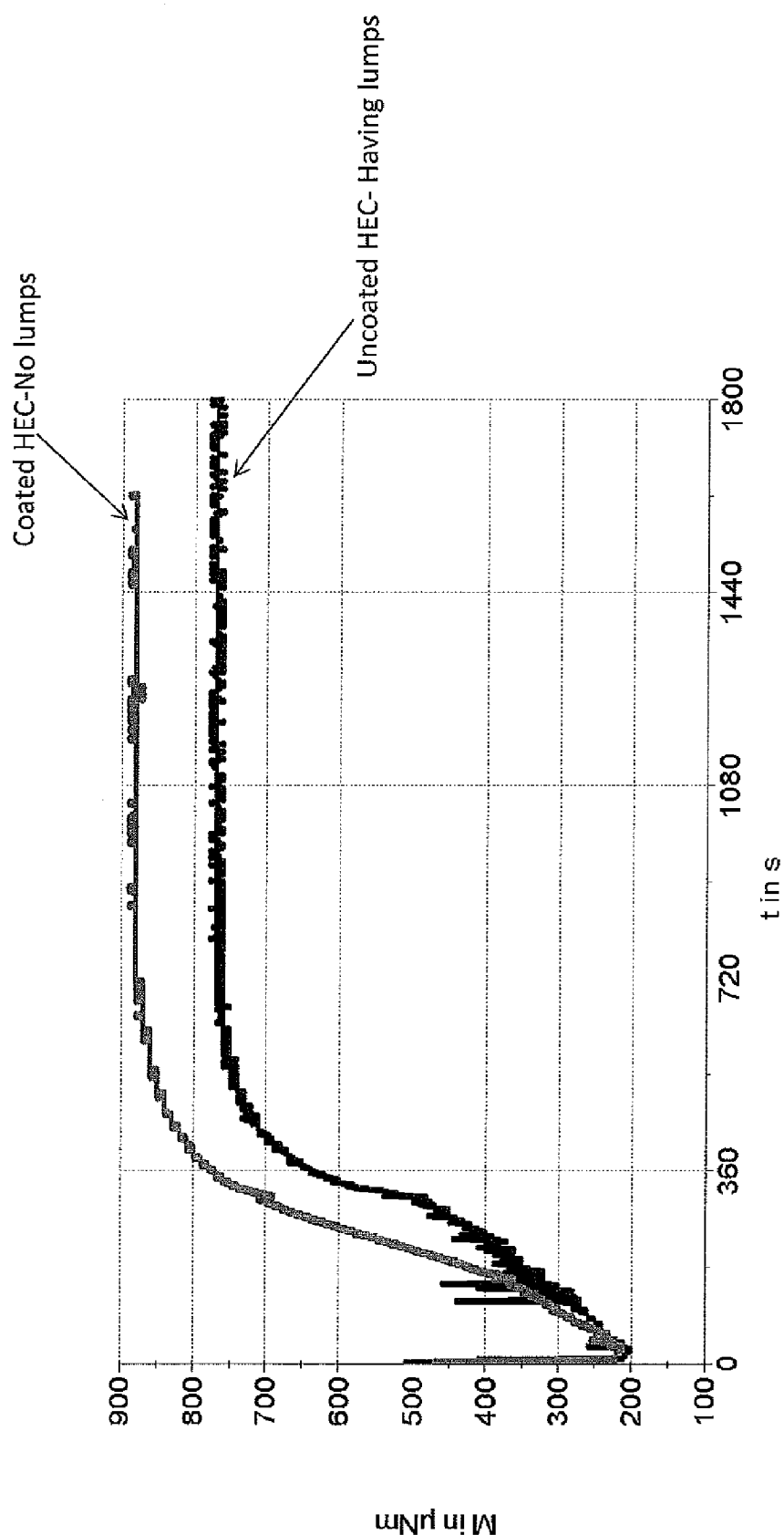
FIG. 3 is a graph of comparison of dissolution over time of powder sample with and without coating in Example 7.

As a control, uncoated Natrosol® 250HX was added in powder form under the same conditions as described above. Lumps were formed and lower viscosity versus the coated HEC was obtained. FIG. 3 shows the comparison of the changes of torques with time for coated and uncoated HEC.

Example 8

A mixture containing 1.5 grams of Natrosol™ 250HHX (hydroxyethyl cellulose, available from Ashland, Inc.) and 0.25 grams (60/40 blond of sodium bicarbonate and citric acid) was prepared. The mixture was rapidly added immediately after the start of agitation to 148.5 grams of 60 mM sodium phosphate buffer under low agitation of 200 RPM.

Figure 4:
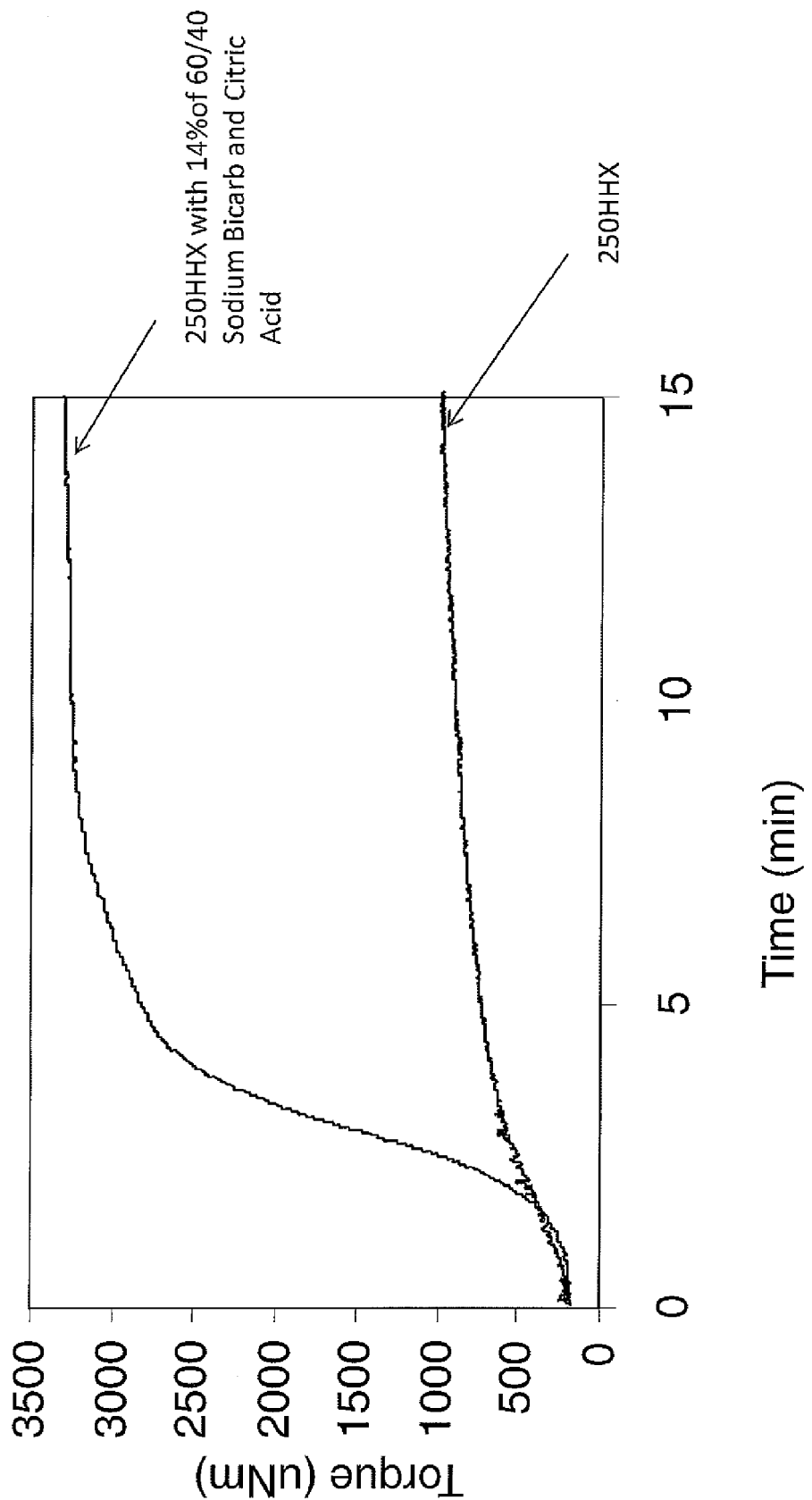
FIG. 4 is a graph illustrating comparison of dissolution over time of the powder sample of Example 8 with comparative sample in DI water.

As a comparative example 1.5 g of Natrosol™ 250HHX was added to DI water using the same procedures as above. A big lump was observed resulting in an insufficient buildup of viscosity. FIG. 4 shows the difference in the rate of dissolution as measured by the increase in torque as a function of time. Clearly, the addition of HEC with sodium carbonate/citric acid results in significantly faster dissolution.

It is, of course, not possible to describe every conceivable combination of the components or methodologies for purpose of describing the disclosed information, but one of ordinary skill in the art can recognize that many further combinations and permutations of the disclosed information are possible. Accordingly, the disclosed information is intended to embrace all such alternations, modifications and variations that fall within the spirit and scope of the appended claims.

What is claimed is:

1. A dry powder composition comprising water soluble polymer powders and a component, wherein the component is selected from the group consisting of boric acid, sodium chloride, sodium metaborate, poly(methylvinylether-alt-maleic acid), poly(methylvinylether-alt-maleic acid)ester copolymer, poly(methylvinylether-alt-maleic anhydride), poly(methylvinylether-alt-maleic anhydride)ester copolymer, poly(styrene-co-maleic acid), poly(styrene-co-maleic acid) ester copolymer, poly(styrene-co-maleic anhydride), poly(styrene-co-maleic anhydride)ester copolymer, styrene acrylic acid copolymer, styrene acrylic acid ester copolymer, hydrophobically modified polyacetal polyether, isobutylene/dimethylaminopropylmaleimide hydroxyethylmaleimide copolymer, isobutylene ethylaminopropylmaleimide/ethoxylated maleimide/maleic acid copolymer, urethane acrylate methacrylate, urea phosphate, silicone, acrylic polymer, polydiallyl dimethyl ammonium chloride, phosphorus ester, polyoxyethylene-polyoxypropylene block copolymer, and hydrophobically modified ethoxylated urethane, and combinations thereof; and wherein the dry powder composition is dispersible in water without forming lumps.

2. The dry powder composition of claim 1, wherein the component is blended with the water soluble polymer powders.

3. The dry powder composition of claim 1, wherein the component is coated on the water soluble polymer powders.

4. The dry powder composition of claim 1, wherein the water soluble polymer powders are polyacrylamides, polyacrylamide derivatives, guar gums, guar gum derivatives, or cellulose derivatives.

5. The dry powder composition of claim 4, wherein the cellulose derivatives are cellulose ethers.

6. The dry powder composition of claim 5, wherein the cellulose ether is hydroxyethyl cellulose.

7. The dry powder composition of claim 1, wherein the component is selected from the group consisting of boric acid, sodium chloride, sodium metaborate, poly(methylvinylether-alt-maleic acid), poly(methylvinylether-alt-maleic acid)ester copolymer, poly(methylvinylether-alt-maleic anhydride), poly(methylvinylether-alt-maleic anhydride)ester copolymer, poly(styrene-co-maleic acid), poly(styrene-co-maleic acid)ester copolymer, poly(styrene-co-maleic anhydride), poly(styrene-co-maleic anhydride)ester copolymer, hydrophobically modified polyacetal polyether, isobutylene/dimethylaminopropylmaleimide hydroxyethylmaleimide copolymer, isobutylene ethylaminopropylmaleimide/ethoxylated maleimide/maleic acid copolymer, urea phosphate, silicone, polydiallyl dimethyl ammonium chloride, phosphorus ester, polyoxyethylene-polyoxypropylene block copolymer, and hydrophobically modified ethoxylated urethane, and combinations thereof; and wherein the dry powder composition is dispersible in water without forming lumps.

8. An A method of making an aqueous protective coating composition, comprising adding the dry powder composition of claim 1 to an aqueous solution.

9. The method of claim 8, wherein the aqueous solution comprises a latex.

10. The method of claim 9, wherein the latex is selected from the group consisting of acrylics, vinyl-acrylics and styrene-acrylics.

11. The method of claim 10, wherein the aqueous solution further comprises a pigment.

12. The method of claim 11, wherein the pigment is selected from the group consisting of hydrated aluminum oxide, barium sulfate, calcium silicate, lay, silica, talc, titanium dioxide, zinc oxide, and mixtures thereof.

13. The method of claim 12, wherein the aqueous protective coating composition has a pigment volume concentration (PVC) upper limit of 85%.

14. The method of claim 12, wherein the aqueous protective coating composition has a pigment volume concentration (PVC) lower limit of 10%.

15. A method of making an aqueous protective coating formulation comprising adding the dry powder composition of claim 1 to a coating formulation while concurrently stirring the formulation.

16. A method of producing a dry powder composition comprising dry blending water soluble polymer powders with a component, wherein the component is selected from the group consisting of boric acid, sodium chloride, sodium metaborate, poly(methylvinylether-alt-maleic acid), poly(methylvinylether-alt-maleic acid)ester copolymer, poly(methylvinylether-alt-maleic anhydride), poly(methylvinylether-alt-maleic anhydride)ester copolymer, poly(styrene-co-maleic acid), poly(styrene-co-maleic acid)ester copolymer, poly(styrene-co-maleic anhydride), poly(styrene-co-maleic anhydride)ester copolymer, styrene acrylic acid copolymer, styrene acrylic acid ester copolymer, hydrophobically modified polyacetal polyether, isobutylene/dimethylaminopropylmaleimide hydroxyethylmaleimide copolymer, isobutylene ethylaminopropylmaleimide/ethoxylated maleimide/maleic acid copolymer, urethane acrylate methacrylate, urea phosphate, silicone, acrylic polymer, polydiallyl dimethyl ammonium chloride, phosphorus ester, polyoxyethylene-polyoxypropylene block copolymer, and hydrophobically modified ethoxylated urethane, and combinations thereof; and wherein the dry powder composition is dispersible in water without forming lumps.

17. A method of producing a dry powder composition comprising water soluble polymer powders at least partially coated with a component, the method comprising:
    (a) at least partially dissolving the component in a solvent to form a solution;
    (b) adding the water soluble polymer powders to the solution and mixing; and
    (c) evaporating the solvent to form the dry powder composition,
    wherein the component is selected from the group consisting of boric acid, sodium chloride, sodium metaborate, poly(methylvinylether-alt-maleic acid), poly(methylvinylether-alt-maleic acid)ester copolymer, poly(methylvinylether-alt-maleic anhydride), poly(methylvinylether-alt-maleic anhydride)ester copolymer, poly(styrene-co-maleic acid), poly(styrene-co-maleic acid)ester copolymer, poly(styrene-co-maleic anhydride), poly(styrene-co-maleic anhydride)ester copolymer, styrene acrylic acid copolymer, styrene acrylic acid ester copolymer, hydrophobically modified polyacetal polyether, isobutylene/dimethylaminopropylmaleimid e hydroxyethylmaleimide copolymer, isobutylene ethylaminopropylmaleimidelethoxylated maleimide/maleic acid copolymer, urethane acrylate methacrylate, urea phosphate, silicone, acrylic polymer, polydiallyl dimethyl ammonium chloride, phosphorus ester, polyoxyethylene-polyoxypropylene block copolymer, and hydrophobically modified ethoxylated urethane, and combinations thereof; and
    wherein the dry powder composition is dispersible in water without forming lumps.

18. The method of claim 16 or 17, wherein the water soluble polymer powders are polyacrylamides, polyacrylamide derivatives, guar gums, guar gum derivatives, or cellulose derivatives.

19. The method of claim 18, wherein the cellulose derivatives are cellulose ethers.

20. The method of claim 19, wherein the solvent comprises at least one of methanol and acetone.

* * * * *